W. BRYANT & J. J. McCANN.
TIRE CASING.
APPLICATION FILED FEB. 10, 1914.
1,114,443.
Patented Oct. 20, 1914.
2 SHEETS—SHEET 1.
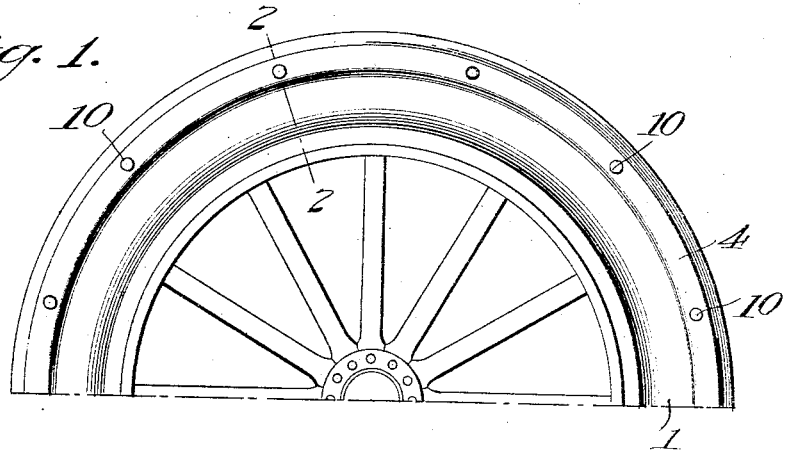
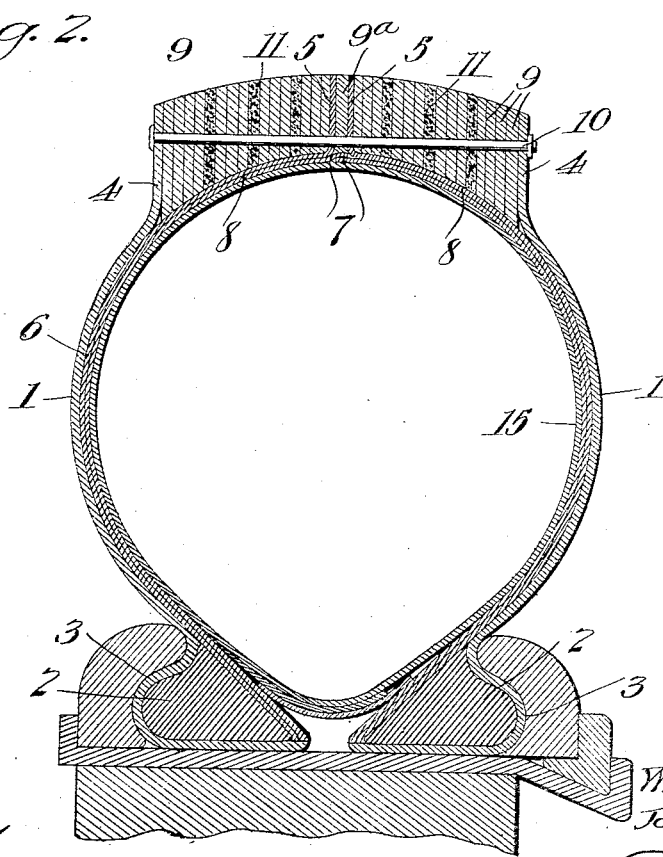

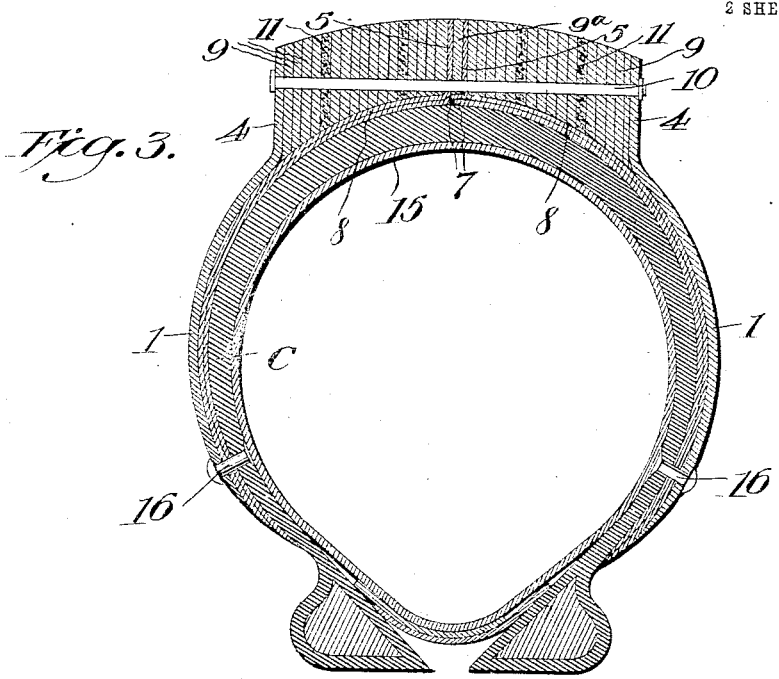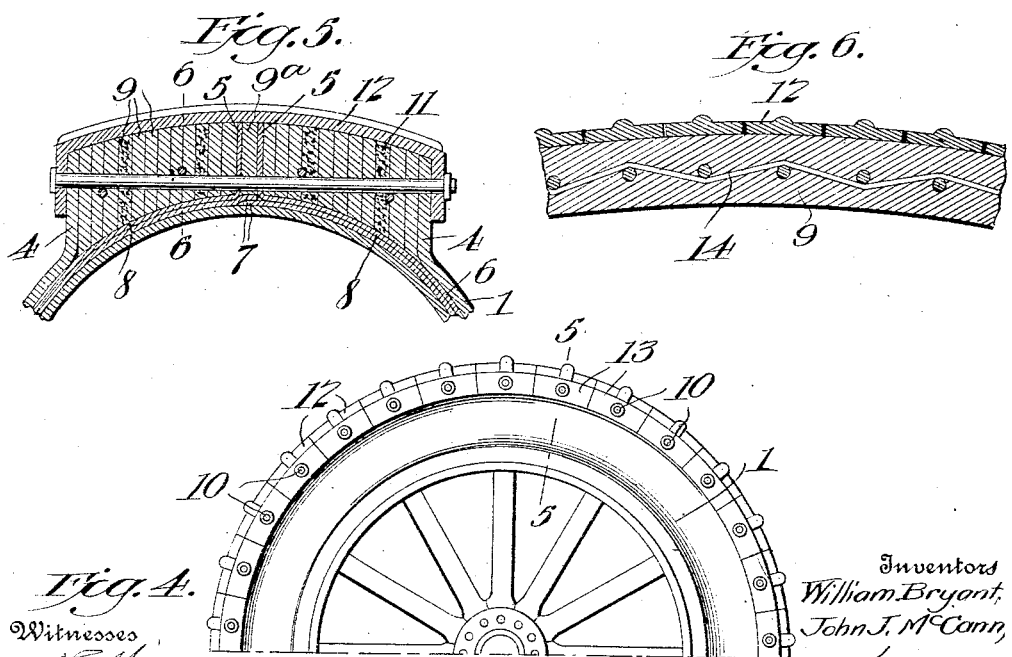

UNITED STATES PATENT OFFICE.

WILLIAM BRYANT AND JOHN JAMES McCANN, OF WINNIPEG, MANITOBA, CANADA.

TIRE-CASING.

1,114,443.  Specification of Letters Patent.  Patented Oct. 20, 1914.

Application filed February 10, 1914. Serial No. 817,868.

*To all whom it may concern:*

Be it known that we, WILLIAM BRYANT and JOHN JAMES McCANN, subjects of the King of Great Britain, residing at Winnipeg, in the Province of Manitoba, Canada, have invented certain new and useful Improvements in Tire-Casings, of which the following is a specification.

This invention relates to the subject of pneumatic tires for automobiles and other vehicles, and more particularly to an improved puncture resisting casing or shoe for tires of this character.

To this end, the invention primarily has in view a puncture resisting tire casing possessing great strength and wearing capacity, while at the same time having the necessary resiliency and flexibility. In this connection, the invention also contemplates a novel tread construction combined with leather cover pieces in such a manner as to provide a tire casing which is not only puncture resisting and of maximum strength and endurance, but is also not subject to blow-outs from any of the usual causes, thereby rendering the improved casing particularly available for use on rough roads, under any and all conditions of service, without being liable to punctures and blow-outs to which the ordinary rubber tires are so susceptible.

A further object of the invention is to provide a novel casing and tread construction which may be utilized as a complete tire casing or shoe, or as a repair cover for a worn or broken tire.

With these and other objects in view which will more readily appear as the nature of the invention is better understood, the same consists of the novel construction, combination, and arrangement of parts hereinafter more fully described, illustrated, and claimed.

Though susceptible of modification, certain preferable embodiments of the invention are shown in the accompanying drawings, in which—

Figure 1 is a half of an automobile wheel, showing in elevation a tire casing mounted thereon and embodying the present invention. Fig 2 is an enlarged cross sectional view on the line 2—2 of Fig. 1. Fig. 3 is a view similar to Fig. 2 showing the improved casing used as a repair cover. Fig. 4 is a view similar to Fig. 1 showing the employment of metal anti-skid plates. Fig. 5 is a cross sectional view on the line 5—5 of Fig. 4. Fig. 6 is a longitudinal detail view of a section of the tread showing the use of a reinforcing wire on the line 6—6 of Fig. 5.

Like reference characters designate corresponding parts in the several figures of the drawings.

Referring to the preferable embodiment of the invention shown in the drawings, the improved tire casing includes in its organization, the opposite main side cover pieces 1—1 which are of circular form and are adapted to extend about the tire body. These pieces may be of continuous lengths or made in adjoining sections at the option of the manufacturer, and each of the same is preferably formed from chrome-tanned or equivalent soft and pliable leather of sufficient thickness and strength to effectually resist and prevent blow-out tendencies, and to maintain, without undue strain, the prescribed internal air pressure carried by the inner tube of the tire.

A practical feature of the invention resides in having each of the circular cover-pieces 1 arranged with its inner edge portion wrapped about, and vulcanized or otherwise permanently united to one of the clencher cores 2 to form a strong and substantial clencher element 3 for the tire casing. The opposite or outer edge portion of each side cover-piece 1 is pressed outward to form an outside outwardly projecting circumferential clamping flange 4 coöperating with an inside similar clamping flange 5. This flange 5 is preferably formed by turning outwardly one or more plies at the outer edge of a stout inner fabric lining 6 which is vulcanized or otherwise permanently united with the cover-piece at the inner side thereof. The said inner fabric lining 6, for each cover piece, has the inner edge portion thereof wrapped about, and vulcanized or otherwise permanently secured to, the core 2 of the clencher element 3, and at its outer edge portion the said lining 6 may have one of its plies, as indicated at 7, extended to form a shielding flap beneath the center part of the tread section of the tire casing. It is to be observed that the inside clamping flange 5 of each cover-piece is arranged substantially at the circumferential center of the tread section, thereby disposing between the flanges 4 and 5, a section 8 of the inner fabric lining 6 which constitutes a tread-base for the tread units 9 constituting together with the two pairs of flanges 4—5, the tread section of the tire casing.

The tread units preferably consist of circular strips or rings of leather arranged edgewise and compacted in side-by-side relation. These leather strips 9 are preferably made of chrome-tanned leather or an equivalent leather which is soft, pliable, and elastic, and which will so closely and tightly compact, under pressure imposed upon the edges thereof, as to form a wearing tread for the tire having a maximum strength, integrity, resiliency, endurance, and yielding wearing face, together with a maximum resistance against perforations and other injuries.

Any desired number of the circular leather tread units or strips 9 may be compacted in a side-by-side relation between the flanges 4 and 5, and these elements are securely held in that relation by means of a plurality of transverse tie bolts 10 passing through the paired flanges 4 and 5 at intervals, and also through the units or strips 9 between said flanges. Furthermore, one of the units 9ᵃ may be clamped between the two inside clamping flanges 5, and such unit or units find a base on the overlapping shielding flaps 7. Also it may be found desirable and preferable to rubberize the adjoining faces of the compacted tread units or strips 9 so that the whole may be vulcanized together to form a substantially homogeneous tread section wherein great resiliency is provided, while at the same time the edgewise disposition of the units or strips provides a tough and durable wearing surface. Furthermore, it is to be observed in connection with the novel arrangement of the units or strips 9 between the flanges 4 and 5 of each cover piece, that lateral separation or opening of the tread section is obviated, and when pressure or load is imposed on the outer edge of the strips 9, the same tend to crush with the result of presenting a surface that offers great resistance to puncture. A further feature of novelty and practicability is that of the base section 8 of the inner fabric lining 6 forming a substantial protective base or shield between the inner edges of the units or strips 9 and the inner tube 15.

If desired to give greater resilience to the tread section, a few felt or equivalent strips 11 may be interspersed throughout said section between the main tread units 9, and should it be desired to improve the non-skidding properties of the tread section, antiskid channel plates 12 may be placed over the tread section, in any desired number, and held in place by the tie bolts 10 passing through the end flanges 13 of such plates. Also, as shown in the modification of Figs. 5 and 6 additional reinforcement may be obtained for the tread section by extending reinforcing wires 14 between some of the tread units, said reinforcing wires being woven about the tie bolts 10, as shown.

The structure described may be employed as the regular outer casing of the tire to receive the inner tube 15, or as a repair cover. In its use as a repair cover, the improved casing may be fastened over and onto the old casing or shoe C by means of the rivets 16, as shown in Fig. 3 of the drawings, or by vulcanization or otherwise, but in this use, as well as in its use as the complete tire casing or shoe itself, the structural features remain the same and perform the same functions.

From the foregoing, it is thought that the construction and advantages of the herein-described improvement in tire casings will be readily apparent without further description, and it will also be understood that various changes in the form, proportion, and minor details of construction may be resorted to without departing from the spirit, or sacrificing any of the advantages of the invention.

We claim:

1. A tire casing including oppositely arranged side cover pieces, each provided at its outer edge with an outside circumferential clamping flange and with a double-layered fabric lining, certain of said layers provided with an inside clamping flange disposed substantially at the circumferential center of the tread section, and other of said layers overlapping to completely protect the inner tube, and tread units clamped between said outside and inside flanges.

2. A tire casing including opposite side cover pieces, each having an outside clamping flange and an inner double-layered fabric lining, the outer layers thereof being formed with inside clamping flanges, and the inner layers of said inner fabric overlapping at their meeting edges, a plurality of tread units disposed edgewise and arranged between the outside and inside clamping flanges of each cover piece and bearing on the outer layer of fabric lining, and a tread unit clamped between the inside flanges formed by the outer of said lining layers of the opposite cover sections and bearing on the overlapped portion of the inner one of said layers.

3. A tire casing including oppositely arranged side cover pieces, each having an outside clamping flange and an inner double-layered fabric lining, the outer layer of said fabric lining of each cover piece having its outer edge portion formed with an inside clamping flange, and the inner layers of said inner fabric overlapping at their meeting edges to form an inside shielding flap, and a plurality of circular tread strips disposed edgewise and compacted in side by side relation between the outside and inside flanges of the cover pieces.

In testimony whereof we hereunto affix our signatures in the presence of two witnesses.

WILLIAM BRYANT.
JOHN JAMES McCANN.

Witnesses:
 A. MANNARD,
 F. E. BARBER.